(12) United States Patent
Richardson et al.

(10) Patent No.: US 8,333,323 B2
(45) Date of Patent: Dec. 18, 2012

(54) MOBILE DEVICE USING SHORT CYCLE POWER SOURCE

(75) Inventors: Neil Richardson, San Jose, CA (US);
James Timothy Sauerwein, Jr.,
Charlotte, NC (US); Douglas Hinson,
Monroe, NC (US); Ynjiun Paul Wang,
Cupertino, CA (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 181 days.

(21) Appl. No.: 12/819,671

(22) Filed: Jun. 21, 2010

(65) Prior Publication Data

US 2011/0309145 A1 Dec. 22, 2011

(51) Int. Cl.
*G06K 7/00* (2006.01)
(52) U.S. Cl. ..................... 235/435; 235/375
(58) Field of Classification Search .............. 235/435, 235/375; 320/101, 103, 106–137
See application file for complete search history.

(56) References Cited

U.S. PATENT DOCUMENTS

| 6,628,107 | B1 | 9/2003 | Bang et al. |
| 2004/0174072 | A1 | 9/2004 | Bourilkov et al. |
| 2008/0121711 | A1 | 5/2008 | Blumer et al. |
| 2008/0150492 | A1 | 6/2008 | Anttila et al. |

FOREIGN PATENT DOCUMENTS

| EP | 1445780 A1 | 11/2004 |
| GB | 2445002 A | 6/2008 |

OTHER PUBLICATIONS

RIM: "RIM Introduces teh New BlackBerry Bold 9650 Smartphone", Apr. 26, 2010, XP000002659252, Retrieved from the Internet: URL: http:/press.rim.com/release.jsp?id-3906 (retrieved on Sep. 16, 2011), the whole document, (2 pages total).
Partial European Search Report of corresponding EP Application No. 11169203.4, as completed on Sep. 16, 2011 (Munich), (total 3 pages).

*Primary Examiner* — Edwyn Labaze
(74) *Attorney, Agent, or Firm* — Heslin Rothenberg Farley & Mesiti, PC

(57) ABSTRACT

A mobile device comprising: a data collection device; a trigger to activate the data collection device; a communication system for wireless communications; a display for displaying information; a processor for controlling software and firmware operation; a keypad for entering data for the processor; a power supply for providing power to the mobile device, the power supply comprising a fuel cell or an ultracapacitor; and a housing for supporting the data collection device, trigger, communication system, display, processor, keypad and power supply.

21 Claims, 7 Drawing Sheets

MOBILE DEVICE USING SHORT CYCLE POWER SOURCE

FIELD OF THE INVENTION

This application relates to indicia reading devices, and more particularly to a mobile device having a short cycle battery.

BACKGROUND

Indicia reading devices (also referred to as scanners, image reader, indicia readers, etc.) typically read data represented by printed or displayed information bearing indicia (IBI) (also referred to as symbols, symbology, bar codes, etc.). For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Optical indicia reading devices typically utilize visible or infrared light. Laser indicia reading devices typically utilize transmitted laser light.

One-dimensional (1D) optical bar code readers are characterized by reading data that is encoded along a single axis, in the widths of bars and spaces, so that such symbols may be read from a single scan along that axis, provided that the symbol is sampled with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, some or all of which must be scanned and decoded, then linked together to form a complete message. Scanning still requires relatively higher resolution in one dimension only, but multiple linear scans at different locations on a second dimension are needed to read the whole symbol.

A class of bar code symbologies known as two dimensional (2D) matrix symbologies have been developed which require image based reading and offer greater data densities and capacities than 1D symbologies. 2D matrix codes encode data as dark or light data elements within a regular polygonal matrix, accompanied by graphical finder, orientation and reference structures.

Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a remote computer.

Some data collection devices, such as hand-held indicia readers, are capable of capturing images as well as reading barcodes. The reading and decoding of a barcode represents an operation distinct from that involved in capturing an image. The reading and decoding of a bar code involves the imaging and then decoding of a one or two dimensional graphic symbol into the alphanumeric, full ASCII or other data sequence encoded by the symbol. The capturing of an image involves storing an electronic visual copy/representation of the image.

A platform that may be utilized to house and indicia reader is a mobile device. Mobile devices (also referred to as smart phones, handheld devices, handheld computers, PDAs, PDTs, etc.) are widely used worldwide, and may be described as pocket-sized computing devices, typically having a display screen with touch input or a miniature keypad. In some mobile devices the input and output are combined into a touch-screen interface. Mobile devices are popular because they provide the assistance and convenience of a conventional computer (laptop, notebook or otherwise) in environments where carrying one would not be practical. Enterprise digital assistants further extend the available functionality of mobile devices.

An Enterprise digital assistant (EDA) is a handheld computer adapted for usage with SME (Small to Medium Enterprise) and Enterprise business Application software|Applications as a data capture mobile device. Such data capture applications include indicia readers, biometrics, magnetic stripe, smart card and RFID data capture technologies used within communication networks such as WLANs (Wireless Local Area Networks), Bluetooth, Wide area network|WAN/LAN/Personal Area Network|PAN voice and data communications, VoIP and GPRS Edge Communications.

The term Portable data terminal (PDT) refers to data collection devices used to collect, process and transfer data to a larger data processing system. Most PDTs are ruggedized to some extent for use in industrial environments.

A PDT generally comprises a mobile computer, a keypad and a data acquisition device. The mobile computer generally comprises a hand held (or "pocket") computing device. Keypads come in a variety of alpha-numeric and numeric configurations. The data acquisition device generally comprises a device that captures data from, for example, radio frequency IDs (RFID), images, and bar codes. Data may also be captured via keypad entry and utilization of a touch pad associated with the mobile computer.

Efforts regarding such systems have led to continuing developments to improve their versatility, practicality and efficiency.

DETAILED DESCRIPTION

Figure 1:
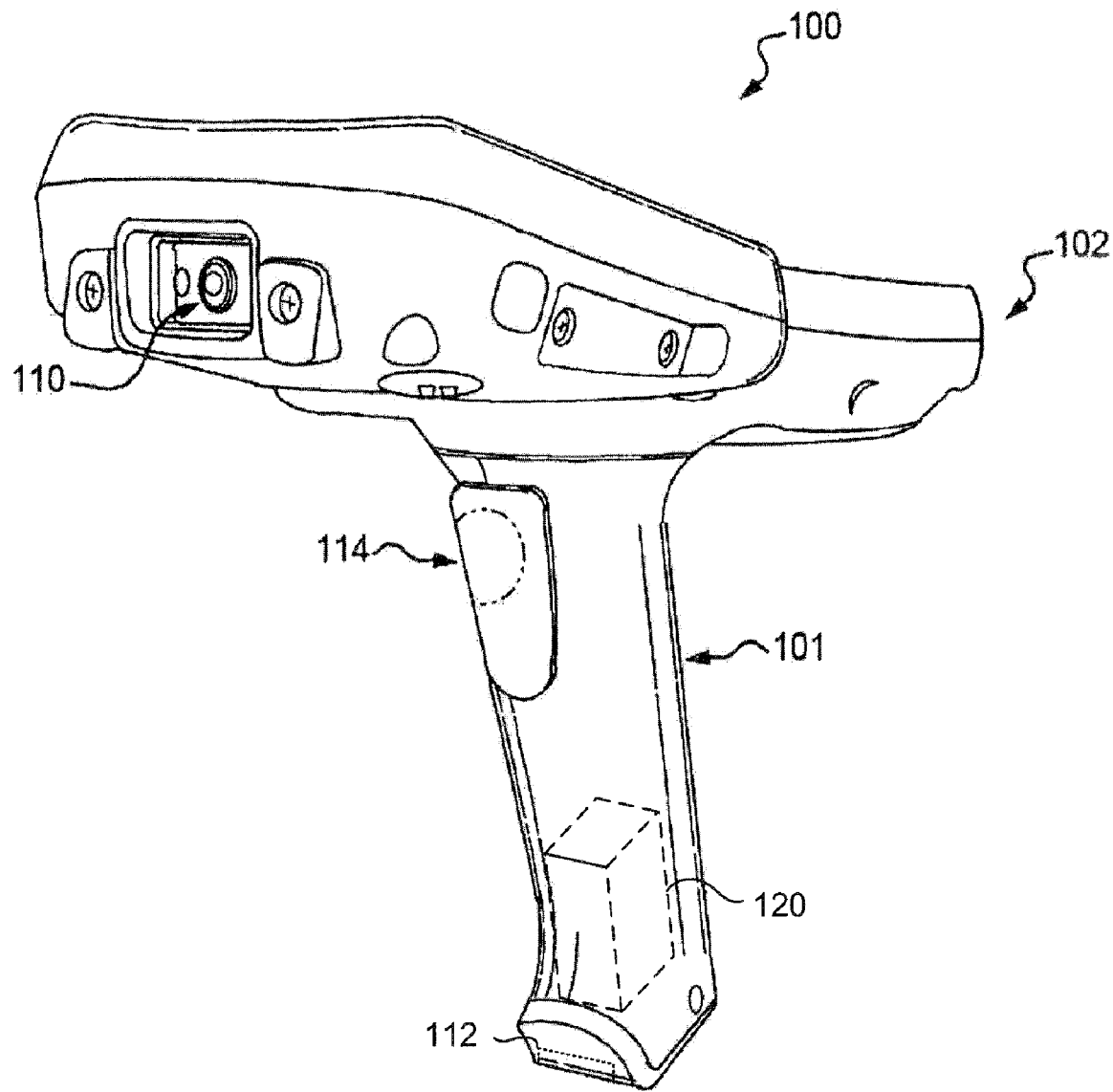
FIG. 1 is an orthogonal view of an exemplary mobile device.

Reference will now be made in detail to the present invention, examples of which are illustrated in the accompanying drawings, wherein like reference numerals refer to like elements throughout. The following description will use nomenclature associated with a reader based mobile device, such as a PDT, however those of ordinary skill in the art will recognize that the present invention is applicable to a variety of portable devices including RF or magstripe based mobile devices, personal data assistants (PDAs): bar code scanners, and consumer electronics, for example digital cameras, cellular phones, and the like. It is anticipated that many such portable devices would benefit from the present invention, including the embodiments thereof described herein.

A method is here, and generally, conceived to be a sequence of steps or actions leading to a desired result and may be implemented as software. While it may prove convenient to discuss such software as if were embodied by a single program, most implementations will distribute the described functions among discrete (and some not so discrete) pieces of software. These pieces are often described using such terms of art as "programs." "objects." "functions." "subroutines," "libraries," ".dlls." "APIs." and "procedures." While one or more of these terms may find favor in the present description, there is no intention to limit the invention to the described configurations.

In general, the sequences of steps in the present methods require physical manipulation of physical quantities. These quantities take the form of optical, electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities and are merely convenient labels applied to these quantities.

With respect to the software described herein, those of ordinary skill in the art will recognize that there exist a variety of platforms and languages for creating software for performing the methods outlined herein. Embodiments of the present invention can be implemented using MICROSOFT VISUAL STUDIO or any number of varieties of C. However, those of ordinary skill in the art also recognize that the choice of the exact platform and language is often dictated by the specifics of the actual system constructed, such that what may work for one type of system may not be efficient on another system. It should also be understood that the methods described herein are not limited to being executed as software on a computer or DSP (Digital Signal Processor), but can also be implemented in a hardware processor. For example, the methods could be implemented with HDL (Hardware Design Language) in an ASIC.

In the present description, an element number followed by a letter generally indicates multiple occurrences of similar, either in structure or function, elements. Further, the use of an italicized "n" (e.g. n) associated with an element number generally denotes either an unspecified one of such elements or a partial or complete group of such elements, the meaning of which is to be drawn from the context of such use.

Figure 2:
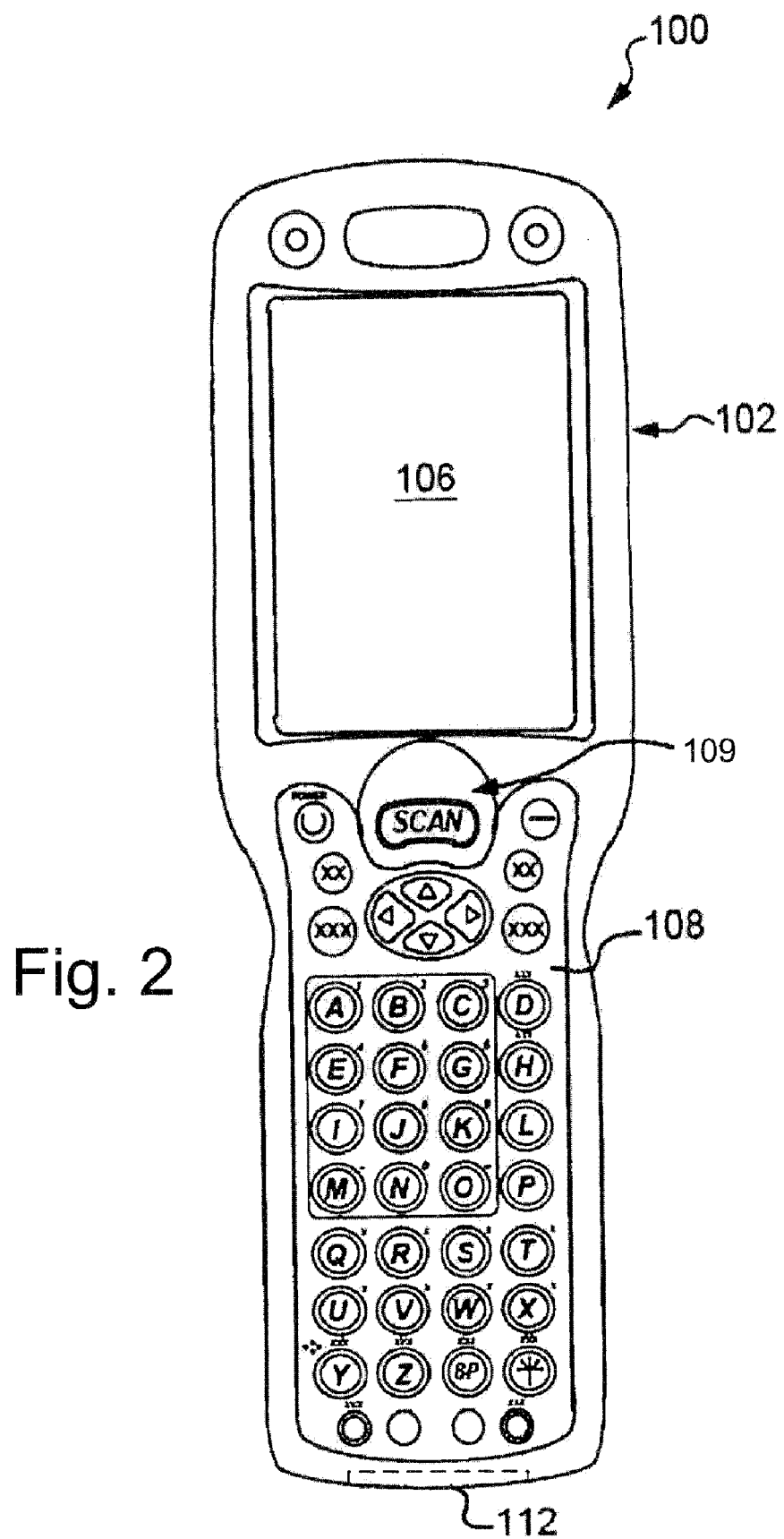
FIG. 2 is a plan view of an exemplary mobile device.

FIGS. 1 and 2 illustrate an exemplary mobile device 100 having a body 102 and a handle 101. The body 102 generally supports a variety of components, including: a battery 105; a LCD with touch screen 106; a keyboard 108 (including a scan button 109); a scan engine 110; a data/charging port 112 and a battery pack 120. The scan engine 110 may comprise, for example, an image engine or a laser engine. The data/charging port 112 may comprise an interface with pins or pads for the transmitting and receiving of data and receiving power for charging the battery.

The handle 101, extending from a bottom surface of the body 102, incorporates a trigger 114. In use, the user may actuate either the scan key 109 or the trigger 114 to initiate a scan via the reader 110. In an exemplary embodiment, the scan may be processed as an image or as a data carrier. In the first case, the captured frame may undergo post capture image processing, such as de-speckling or sharpening and then stored as an image file (e.g. a bitmap, jpeg of gif file) and possibly displayed. In the second case the captured frame also undergoes post capture image processing but the image is then analyzed, e.g. decoded, to identify data represented therein. The decoded data is stored and possibly displayed on the mobile device 100. Additional processing of the image or data may take place on the mobile device 100 and/or a data processing resource to which the data is transmitted via any available transport mechanism on the mobile device 100. Some examples of known transport mechanisms utilized by mobile devices include: Bluetooth, WiFi. GSM, CDMA, USB. IrDA, removable FLASH memory, parallel and serial ports (including for example. RS-232).

Exemplary image readers may have a plurality of settings that may be adjusted. These settings, including gain and shutter speed, affect the image acquisition process and typically affect the image captured. A variety of functions, designed to modify captured images are often provided in software or firmware associated with the imager. Examples of these functions include sharpness and edge algorithms.

Figure 3:
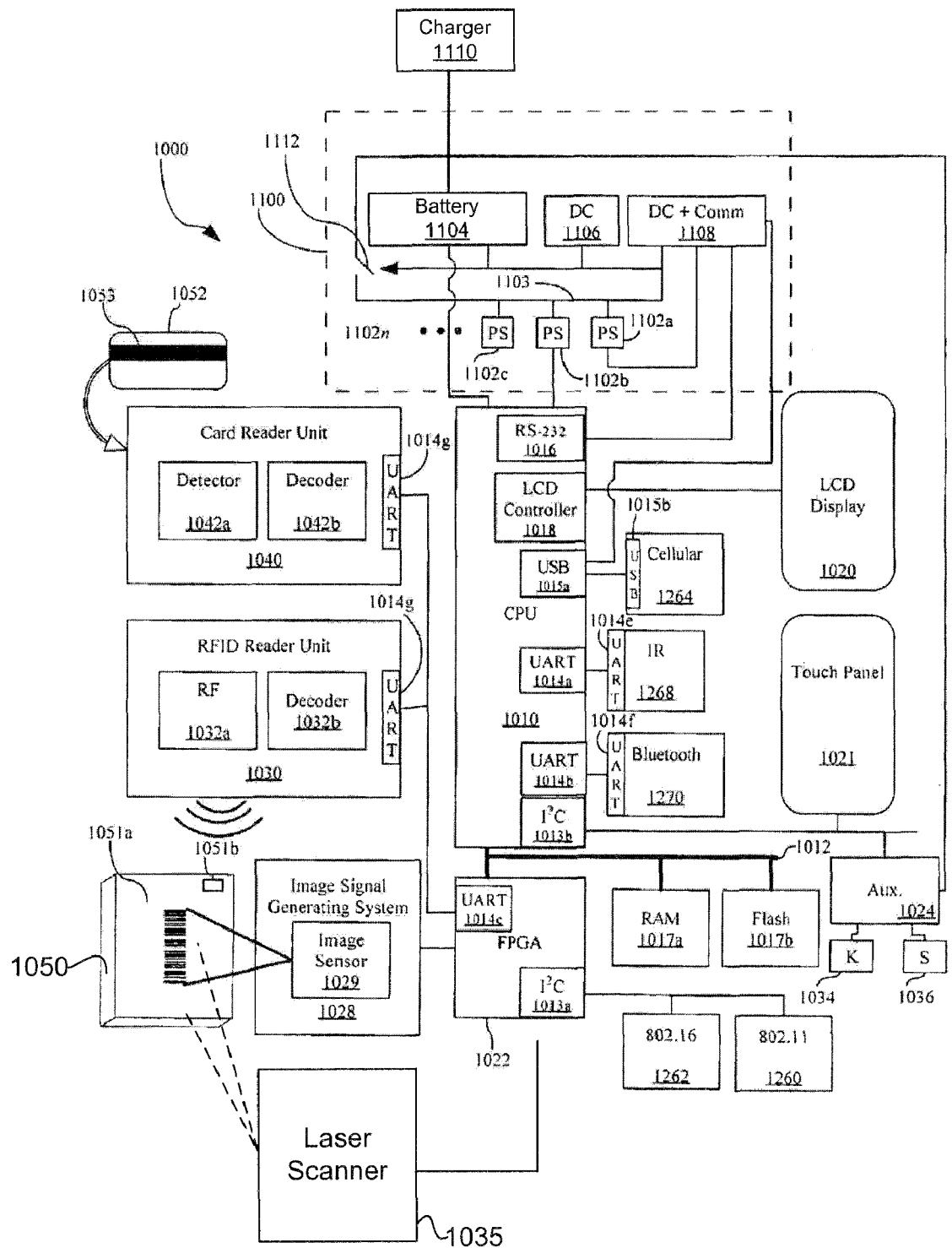
FIG. 3 is a simplified schematic block diagram of an exemplary mobile device.

FIG. 3 is a simplified block diagram of an exemplary mobile device 1000 which may include a number of sub-systems (collectively referred to as 2000) central processing unit (CPU) 1010 which receives data from and outputs data to other sub-systems for storage, transmission and additional processing. CPU 1010 may be implemented using any number of off the shelf solutions including: embedded processors; general purpose processors; custom solutions such as pre-configured field programmable gate arrays (FPGAs) and application specific integrated circuits (ASICs). Overall operation of the CPU 1010 is controlled by software or firmware, typically referred to as an operating system, stored in one or more memory locations 1017n, including RAM 1017a and FLASH memory 1017b.

Communication to and from the CPU 1010 and the various sub-components may be via one or more ports or busses, including a main system bus 1012; I.sup.2C busses 1013a and 1013b; a plurality of Universal Asynchronous Receivers/Transmitter (UART) ports 1014n, a Universal Serial Bus (USB) 1015n, and an RS-232 port 1016.

The illustrated CPU 1010 may include a liquid crystal display (LCD) controller 1018 for controlling an LCD 1020. A touch sensitive panel 1021, which may be in communication with one or more of the CPU 1010 and an auxiliary processor 1024 via the I.sup.2C bus 1013b, may be associated with the LCD 1020 for receipt of data thereon. The combination of the LCD 1020 and the touch sensitive panel 1021 is often referred to as a "touch screen."

A variety of secondary processors may be provided to perform general and application specific functions. The example illustrated in FIG. 3 provides two such processors: a field programmable gate array (FPGA) 1022 and an auxiliary processor 1024. The auxiliary processor 1024 may comprise any number of embedded (or general purpose) processors.

The auxiliary processor 1024 may interface with and control a variety of data input devices including, for example, the touch panel 1021, a keyboard 1034 and a scan button 1036. By way of example, the mobile device 1000 may be configured so that displayed menu options are selected by physically depressing a key on the keyboard 1034 or activating the touch screen 1021 with use of a finger or stylus. The scan button 1036 may be used for initiating and controlling the various data collection systems, such as an image signal generating system 1028, an RFID sensing system 1030, or a magnetic stripe reader 1040.

The data collection systems (e.g. the image signal generating system 1028, the RFID sensing system 1030, and the magnetic stripe reader 1050) may be controlled by one or more of the CPU 1010, the auxiliary processor 1024, and the FPGA 1022. In this case, the FPGA 1022 initiates and controls the operation of the data collection systems and accumulates data received there from prior to depositing such data in memory 1017*n*.

The image signal generating system 1028 generally comprises a two dimensional solid state image sensor 1029 utilizing such technologies as CCD, CMOS, and CID, for capturing an image containing data, e.g. a bar code or signature. Two-dimensional solid state image sensors generally have a plurality of photo sensor picture elements ("pixels") which are formed in a pattern including a plurality of rows and a plurality of columns of pixels. The image signal generating system 1028 further includes an imaging optics (not shown) focusing an image onto an active surface of the image sensor 1029. Image sensor 1029 may be incorporated on an image sensor IC chip having disposed thereon image sensor control circuitry, image signal conditioning circuitry, and an analog-to-digital converter. FPGA 1022 manages the capture and transfer of image data into RAM 1017*n*. Decoding may be performed by the CPU 1010 or any suitable secondary processor. A variety of alternatives, including a dedicated laser barcode scanner 1035 may also be utilized.

One use of the image signal generating system 1028 is for reading and interpreting bar codes such as bar code 1051*a* on an item 1050. For this operation, when the scan button 1036 is actuated, the CPU 1010 causes the appropriate control signals to be sent to the image sensor 1029. In response thereto, the image sensor 1029 outputs digital image data including (hopefully) an adequate representation of the bar code symbol 1050. The digital image data is streamed to the FPGA 1022 where it is collected and subsequently deposited in memory 1017*n*. In accordance with a decoding program (not specifically illustrated) an attempt may be made to decode the bar code represented in the captured electronic image representation. The capture and decoding of image data may occur automatically in response to a trigger signal being generated, usually by activation of the scan button 1036 or a pre-selected key on keyboard 1034. For example, the CPU 1010 may be configured, typically through execution of a program resident in memory 1017*n*, to continuously capture and decode bar code symbols represented therein as long as scan button 1036 is actuated. The cycle may be terminated upon successfully decoding the bar code symbol or by timing out after a number of unsuccessful attempts.

In addition to having a decode operation, the image signal generation system 1028 may also be configured for an image capture operation. In an image capture operation, control circuit 1010 captures an electronic image representation in response to the scan button 1036 being actuated without attempting to decode a decodable symbol represented therein. The captured electronic image representation may be one or more of (i) stored into a designated memory location of memory 1017*n*, (ii) transmitted to an external spaced apart device, or (iii) displayed on LCD 1020. This mode may be used to capture, for example an image of a signature or damage to a package.

In an image capture operation, the image signal generation system 1028 may be operated in two distinct stages: aiming and final capture. During the aiming stage, frames output by the image signal generation system 1028 are displayed on the LCD display 1020. These frames are not saved. Once a user is satisfied with the content of the image displayed on the LCD display 1020, he or she initiates the final capture stage. In final capture stage, a frame (either the frame currently in the buffer or a next frame) is saved and typically displayed on the LCD 1020. Generally, the aiming stage is initiated by pressing a designated button (such as a scan button 1036) with the final capture stage being initiated by releasing the designated button. It is generally desirable to display frames as quickly as possible in the aiming stage to ensure that the user is viewing a recently outputted frame. Otherwise there is a danger that the frame the user views when deciding to initiate capture is outdated and does not accurately reflect what the image signal generating system 1028 is currently outputting (and what will be captured in final capture stage).

The RFID reader unit 1030 may include an RF oscillation and receiver circuit 1032*a* and a data decode processing circuit 1032*b*. RFID reader unit 1030 may be configured to read RF encoded data from a passive RFID tag, such as tag 1051*b*, which may be disposed on article 1050.

Where the RFID reader unit 1032*a* is configured to read RF encoded data from a passive RFID tag, the RF oscillation and receiver circuit 1032*a* transmits a carrier signal to the passive tag which in turn converts the carrier energy to voltage form and actuates a transponder (not shown) to transmit a radio signal representing the encoded tag data. The RF oscillator and receiver circuit 1032*a*, in turn, receives the radio signal from the tag and converts the data into a digital format. The data decode processing circuit 1032*b*, typically including a low cost microcontroller IC chip, decodes the received radio signal information received by RF oscillator and receiver circuit 1032*a* to decode the encoded identification data originally encoded into RFID tag.

RFID reader unit 1030 may, for example, operate in a selective activation mode or in a continuous read operating mode. In a selective activation mode RFID reader unit 1030 broadcasts radio signals in an attempt to activate a tag or tags in its vicinity in response to an RFID trigger signal being received. In a continuous read mode, RFID reader module 1030 continuously broadcasts radio signals in an attempt to actuate a tag or tags in proximity with unit automatically, without module 1030 receiving a trigger signal. mobile device 1000 may be configured so that the CPU 1010 recognizes a trigger signal under numerous conditions, such as: (1) a trigger is actuated: (2) an RFID trigger instruction is received from a remote device; or (3) the CPU 1010 determines that a predetermined condition has been satisfied.

Still further, the mobile device 1000 may include a card reader unit 1040 for reading data from a card 1052. Card reader unit 1040 generally comprises a signal detection circuit 1042*a* and a data decode circuit 1042*b*. In operation, the signal detection circuit 1042*a* detects data, from for example a magnetic strip 1053 on a card 1052. Subsequently, the data decode circuit 1042*b* decodes the data. The decoded data may be transmitted to the CPU 1010 for further processing via the FPGA 1022. The card reader unit 1040 can be selected to be of a type that reads card information encoded in more than one data format, such as magnetic stripe data, smart card or Integrated circuit card (IC card) data, and RF transmitted data.

The mobile device 1000 may further include a plurality of wireless communication system links such as an 802.11 communication link 1260, an 802.16 communication link 1262, a communication link 1264 for communication with a cellular network such as a network in accordance with the Global System for Mobile Communications (GSM), an IR communication link 1268, and a Bluetooth communication link 1270. Each of these links facilitates communication with a remote device and may be used to transfer and receive data.

An exemplary power circuit 1100 supplies power to the mobile device 1000. The power circuit 1100 generally comprises a series of power regulators 1102*n* that regulate the power supplied to the various components of the mobile device 1000. The power regulators 1102*n* each generally comprise step up or step down circuits which are in turn connected to each of the various components in the mobile device 1000 that require the particular voltage output by that power regulator 1102*n*.

The power regulators receive current from a power bus 1103 which is, in turn, supplied by an exemplary power source 1104, a first power input 1106 or a connector 1108 that includes a second power input. The first power input 1106 may comprise a DC power jack, for example, a 2.5 mm coaxial DC power plug which receives 9.5 volts from a conventional AC/DC transformer. The connector 1108 may comprise any number of known connection technologies. Certain pins of the connector 1108 may be dedicated to receiving DC power while other pins are dedicated to one or more communication paths, such as RS-232 and USB. It may also prove advantageous to provide DC power out, for example from a power supply 1102*a*, so as to power tethered accessories, such as external magnetic stripe or RFID readers (not shown). It may prove further advantageous to add circuitry to insulate the first power input 1106 from the second power input on the connector 1108 and other components in the mobile device 1000 in the event that a user attempts to supply power to both power inputs.

The power source 1104 may be charged by a charge circuit 1110 which receives power from either the first power input 1106 or the second power input on the connector 1108. Control may be provided to the CPU 1010 which may modify the charging behavior of the charge circuit 1110 based on information generated by the auxiliary processor 1024. In an exemplary embodiment, the auxiliary processor 1024 monitors parameters via an interface. A switch 1112 may control the power source based upon the presence of power from the first power input 1106 or the second power input on the connector 1108. Thus, when an external power supply is connected to either the power input 1106 or the second power input on the connector 1108, the power source is isolated from the power regulators 1102*n* and may be charged via the charge circuit 1110. Once power is removed from the power input 1106 and the connector 1108, the power source is connected to the power regulators 1102*n*.

Figure 4:
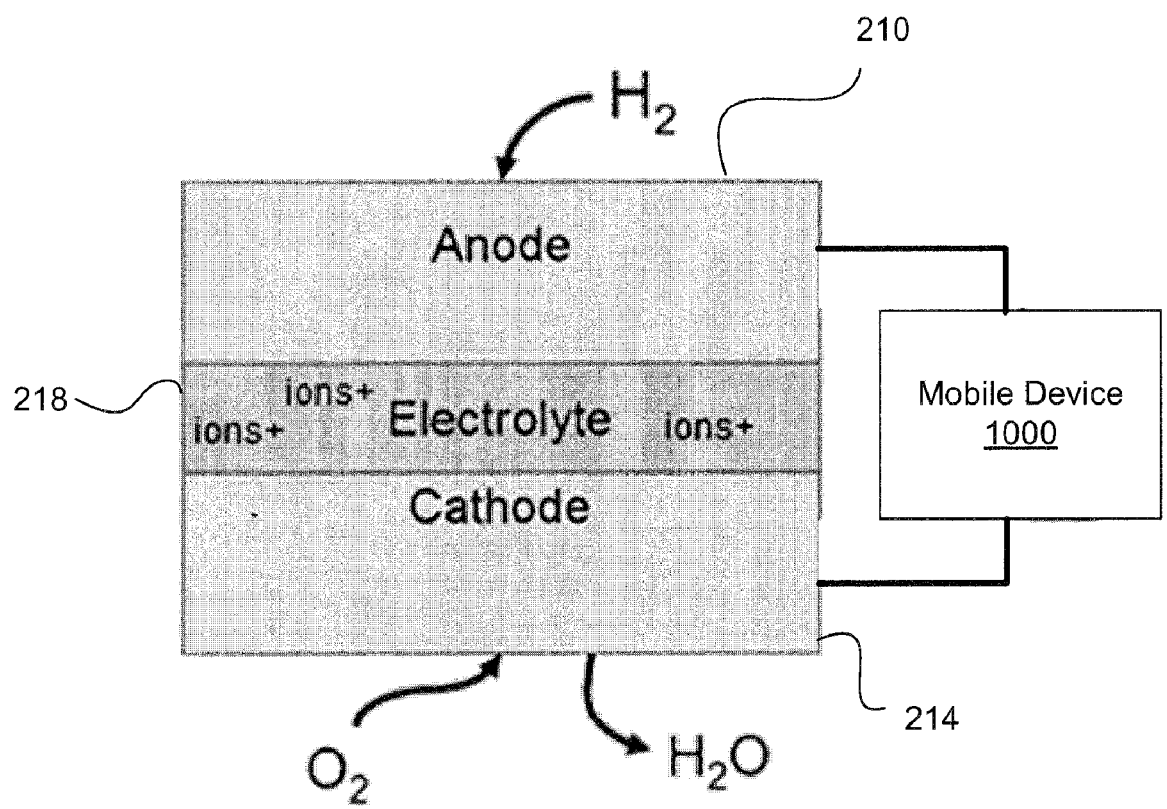
FIG. 4 is a block diagram of an exemplary fuel cell.

An exemplary power source 1104 may be comprised of an energy storage system with a rapid or short charge cycle, such as a fuel cell which, as illustrated in FIG. 4, is at least one open electrochemical cell comprised of an anode 210 [YPW: FIG. 4 missing labels 210, 214, 218] and cathode 214 separated by an electrolyte 218 that converts a source fuel into an electrical current and water. It generates electricity inside a cell through reactions between a fuel and an oxidant, triggered in the presence of an electrolyte. The reactants flow into the cell, and the reaction products flow out of it, while the electrolyte remains within it. Fuel cells are thermodynamically open electrochemical cell systems that consume a reactant from an external source, which must be replenished. Many combinations of fuels and oxidants are possible. A hydrogen fuel cell uses hydrogen as its fuel and oxygen as its oxidant. Other fuels may include hydrocarbons and alcohols. Other oxidants may include chlorine and chlorine dioxide.

Figure 5:
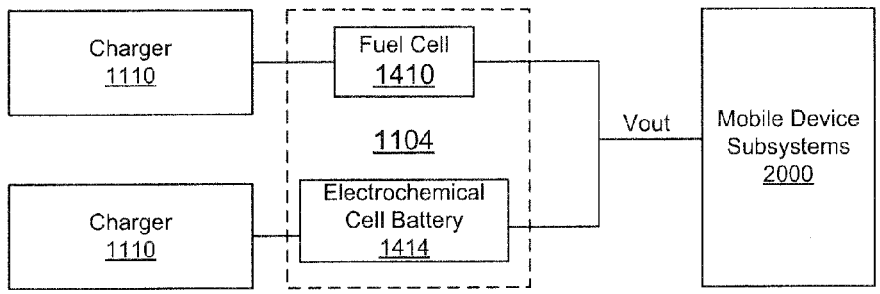
FIG. 5 is a schematic block diagram of an exemplary mobile device power supply system.

In an exemplary embodiment illustrated in FIG. 5, power source 1104 may be comprised of a hybrid battery pack 1104 comprising a fuel cell 1410 and a thermodynamically closed electrochemical cell battery 1414, such as a NiMh, NiCd, Li Ion, or Li Polymer cell battery connected to generate a single output voltage Vout.

Thermodynamically closed electrochemical cell battery, such as a NiMh, NiCd, Li Ion, or Li Polymer cell batteries generally provide the ability to drive short duration, high current loads while fuel cells provide space and weight advantages.

Figure 6:
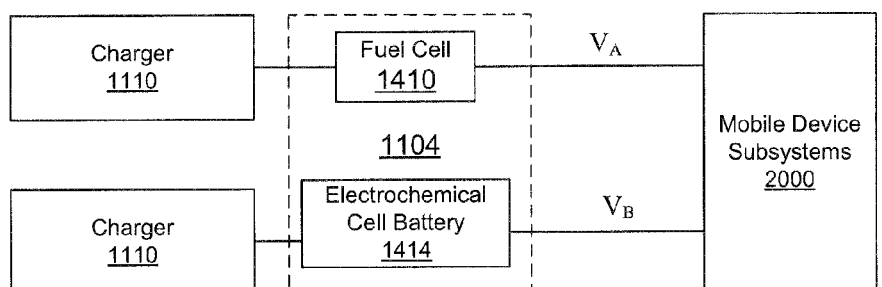
FIG. 6 is a schematic block diagram of an exemplary mobile device power supply system.

In another exemplary embodiment illustrated in FIG. 6, power source 1104 may be comprised of a hybrid battery pack 1104 comprising a fuel cell 1410 and a thermodynamically closed electrochemical cell battery 1414, such as a NiMh, NiCd, Li Ion, or Li Polymer cell battery wherein the thermodynamically closed electrochemical cell battery powers the mobile device during times of high current load requirements and the fuel cell 1410 powers the mobile device during lower current load requirements, such as steady state type conditions.

Steady state conditions may be those conditions wherein a specified characteristic of a condition, such as a value, rate, periodicity, or amplitude, exhibits only negligible change over a predetermined period of time. A steady state condition may exist after all initial transients or fluctuating conditions have damped out, and all currents, voltages, or fields remain essentially constant, or oscillate uniformly.

In another exemplary embodiment power source 1104 may be comprised of a hybrid battery pack 1104 comprising a fuel cell 1410 and a thermodynamically closed electrochemical cell battery 1414, such as a NiMh, NiCd, Li Ion, or Li Polymer cell battery wherein the fuel cell 1410 powers the mobile device during times of high current load requirements and the thermodynamically closed electrochemical cell battery powers the mobile device during lower current load requirements, such as steady state type conditions.

Figure 7:
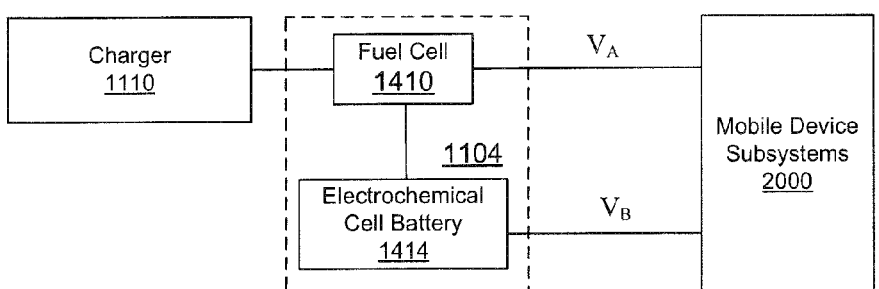
FIG. 7 is a schematic block diagram of an exemplary mobile device power supply system.

In another exemplary embodiment illustrated in FIG. 7, power source 1104 may be comprised of a hybrid battery pack 1104 comprising a fuel cell 1410 which charges a thermodynamically closed electrochemical cell battery 1414, such as a NiMh, NiCd, Li Ion, or Li Polymer cell battery.

Figure 8:
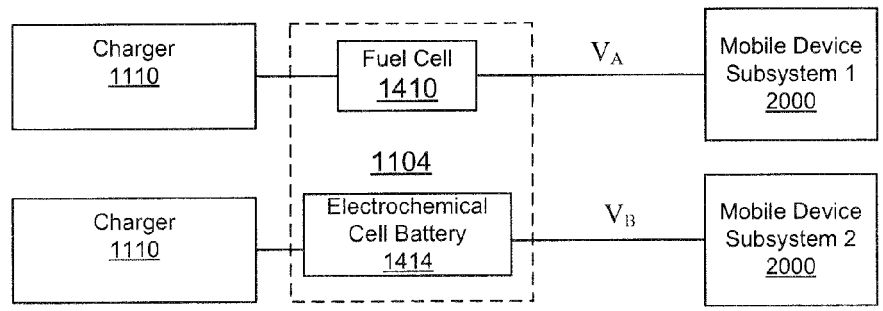
FIG. 8 is a schematic block diagram of an exemplary mobile device power supply system.

In another exemplary embodiment illustrated in FIG. 8, power source 1104 may be comprised of a hybrid battery pack 1104 comprising a fuel cell 1410 and a thermodynamically closed electrochemical cell battery 1414, such as a NiMh, NiCd, Li Ion, or Li Polymer cell battery, wherein the fuel cell 1410 may be used to provide power to a mobile device subsystem 1 with relatively higher power requirements and the thermodynamically closed electrochemical cell battery is utilized to provide power to a mobile device subsystem 2 with relatively lower power requirements, such as subsystems that operate in more steady state type conditions.

In another exemplary embodiment power source may be comprised of a hybrid battery pack 1104 comprising a fuel cell and a thermodynamically closed electrochemical cell battery 1414, such as a NiMh, NiCd, Li Ion, or Li Polymer cell battery, wherein the fuel cell may be removed from the mobile device and placed into a charging station separate from the mobile device, at which time power for any onboard systems of the mobile device that need to continue in an "active" state (such as WiFi, GPS, etc) may be provided by the thermodynamically closed electrochemical cell battery.

In an exemplary embodiment, power source 1104 may be comprised of an energy storage system with a rapid or short charge cycle, such as an ultracapacitor, also known as a supercapacitor, pseudocapacitor, electrochemical double layer capacitor (EDLC) or electric double layer capacitor.

Figure 9:
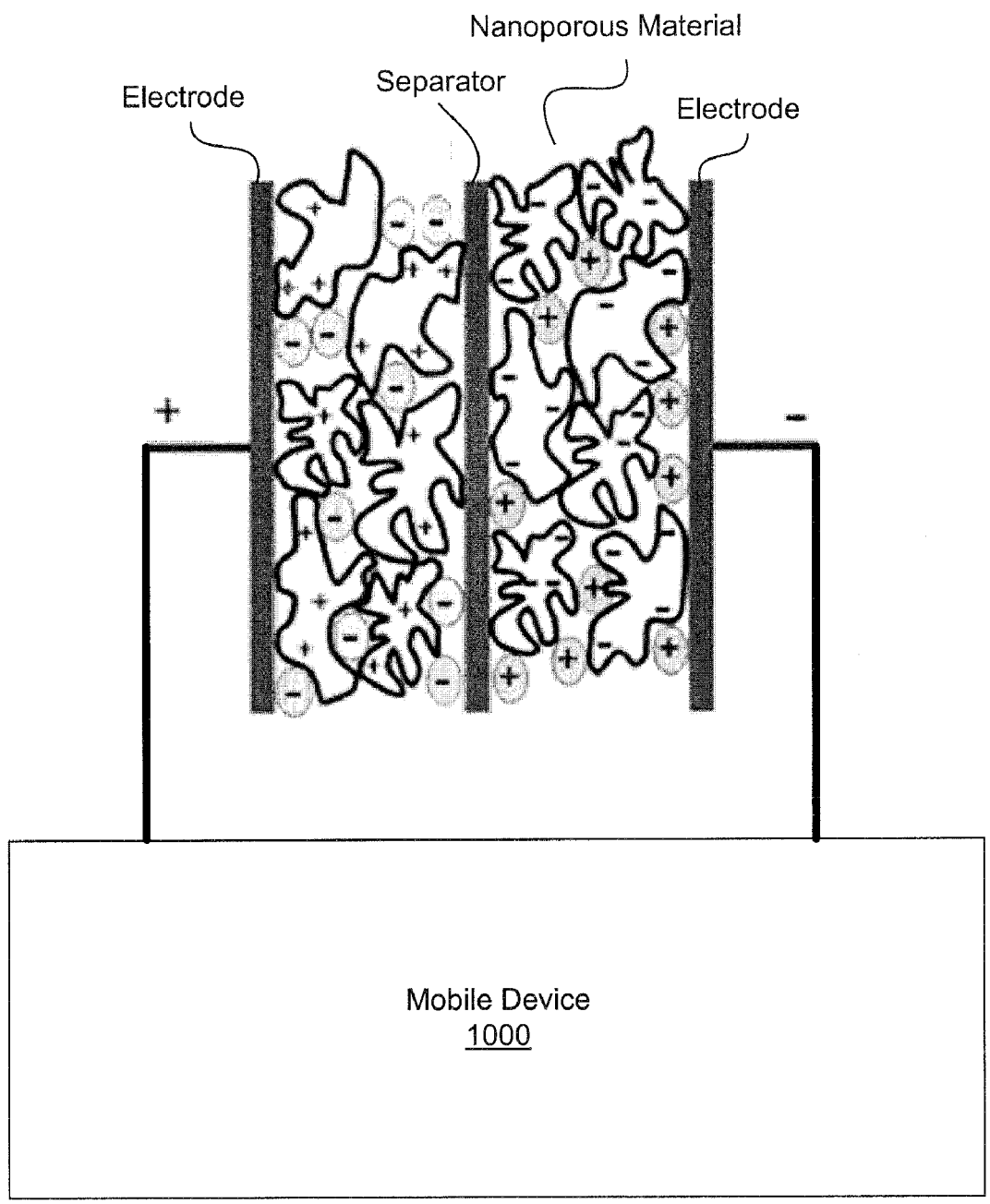
FIG. 9 is a block diagram of an exemplary ultracapacitor.

Referring to FIG. 9, an exemplary ultracapacitor may be described and illustrated as an electrolyte suspended between two nonreactive porous electrodes (or plates or collectors) with a voltage potential applied across the collectors. In an individual ultracapacitor cell, the applied potential on a positive electrode attracts negative ions in the electrolyte, while the potential on the negative electrode attracts the positive ions. A dielectric separator between the two electrodes prevents charge from moving between the two electrodes.

As a storage device, the ultracapacitor relies on the microscopic charge separation at an electrochemical interface to store energy. Since the capacitance of these devices is proportional to the active electrode area, increasing the electrode surface area increase the capacitance, hence increasing the amount of energy that can be stored. High surface area is achieved by utilizing nanoporous material as the electrolyte, such as activated carbon or sintered metal powders. Use of nanoporous material results in an effective separation of charge despite the thin (on the order of nanometers) physical separation of the layers. The lack of need for a bulky layer of dielectric permits the packing of "plates" with much larger surface area into a given size, resulting in high capacitances in small packages.

Ultracapacitors have a high energy density when compared to common capacitors, typically on the order of thousands of times greater than a high capacity electrolytic capacitor. For example, a typical D-cell sized electrolytic capacitor will have a capacitance in the range of tens of millifarads. The same size electric double-layer capacitor would have a capacitance of several farads, an improvement of about two or three orders of magnitude in capacitance, but usually at a lower working voltage.

Ultracapacitors may not provide continuous energy for as long as thermodynamically closed electrochemical cell batteries, such as a NiMh, NiCd, Li Ion, or Li Polymer cell batteries, they may be charged faster. For example, an ultracapacitor may be charged in minutes or seconds as opposed to hours.

Figure 10:
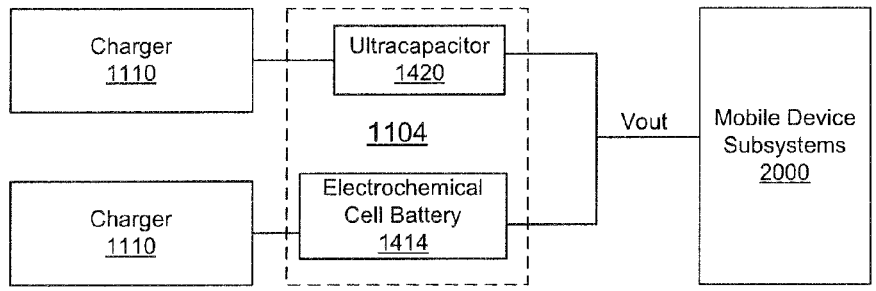
FIG. 10 is a schematic block diagram of an exemplary mobile device power supply system.

In an exemplary embodiment illustrated in FIG. 10, power source 1104 may be comprised of a hybrid battery pack 1104 comprising an ultracapacitor 1420 and a thermodynamically closed electrochemical cell battery 1414, such as a NiMh, NiCd, Li Ion, or Li Polymer cell battery connected to generate a single output voltage Vout.

Figure 11:
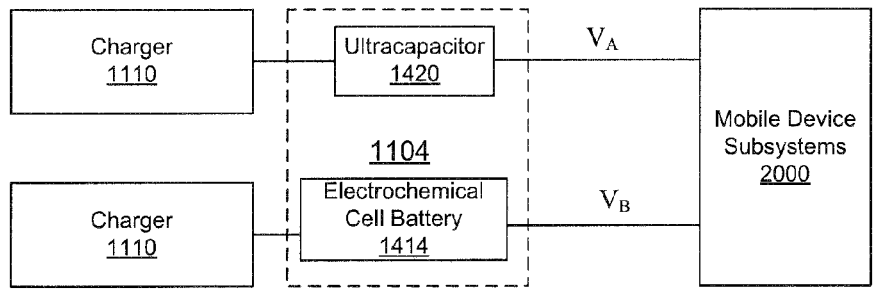
FIG. 11 is a schematic block diagram of an exemplary mobile device power supply system.

In another exemplary embodiment illustrated in FIG. 11, power source 1104 may be comprised of a hybrid battery pack 1104 comprising an ultracapacitor 1420 and a thermodynamically closed electrochemical cell battery 1414, such as a NiMh, NiCd, Li Ion, or Li Polymer cell battery, wherein the thermodynamically closed electrochemical cell battery powers the mobile device during times of high current load requirements and the ultracapacitor provides power during lower current load requirements, such as steady state type conditions.

In another exemplary embodiment power source 1104 may be comprised of a hybrid battery pack 1104 comprising an ultracapacitor 1420 and a thermodynamically closed electrochemical cell battery 1414, such as a NiMh, NiCd, Li Ion, or Li Polymer cell battery, wherein the ultracapacitor powers the mobile device during times of high current load requirements and the thermodynamically closed electrochemical cell battery provides power during lower current load requirements, such as steady state type conditions.

Figure 12:
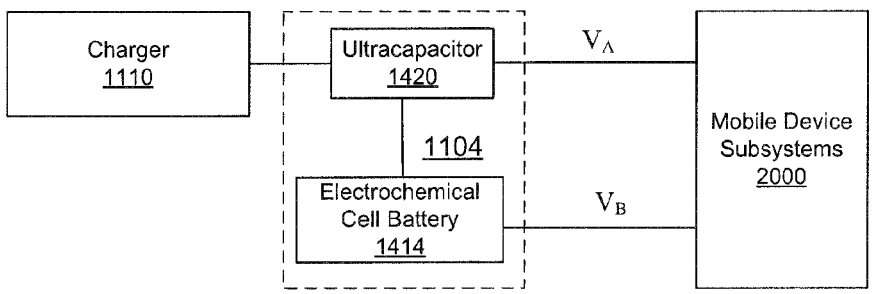
FIG. 12 is a schematic block diagram of an exemplary mobile device power supply system.

In another exemplary embodiment illustrated in FIG. 12, power source 1104 may be comprised of a hybrid battery pack 1104 comprised of an ultracapacitor 1420 which charges a thermodynamically closed electrochemical cell battery 1414, such as a NiMh, NiCd, Li Ion, or Li Polymer cell battery.

Figure 13:
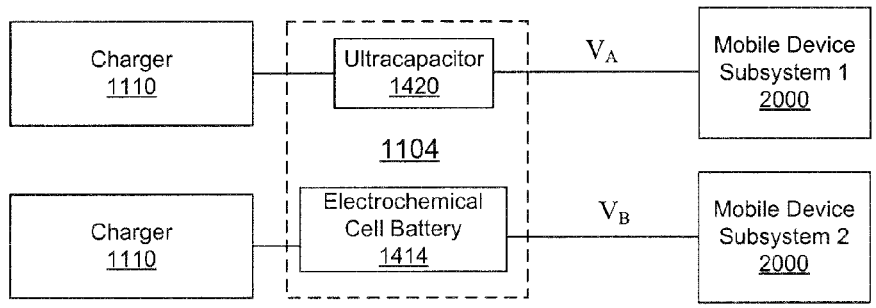
FIG. 13 is a schematic block diagram of an exemplary mobile device power supply system.

In another exemplary embodiment illustrated in FIG. 13, power source 1104 may be comprised of a hybrid battery pack 1104 comprising an ultracapacitor 1420 and a thermodynamically closed electrochemical cell battery 1414, such as a NiMh, NiCd, Li Ion, or Li Polymer cell battery, wherein the ultracapacitor may be used to provide power to a mobile device subsystem 1 with relatively high power requirements and the thermodynamically closed electrochemical cell battery is utilized to provide power to a mobile device subsystem 2 with lower power requirements than subsystem 1, such as subsystems that operate in more steady state type conditions.

In another exemplary embodiment illustrated in FIG. 14, power source 1104 may be comprised of a hybrid battery pack 1104 comprising an ultracapacitor 1420 and a thermodynamically closed electrochemical cell battery 1414, such as a NiMh, NiCd, Li Ion, or Li Polymer cell battery, which charges an ultracapacitor 1420. In most of retail wireless handheld scanner applications and transportation PDT applications, only a short cycle operation time when the unit leaves the cradle. The ultracapacity may be sufficient for sustaining the entire short cycle operation without consuming energy from rechargeable battery thus prolong the life of battery.

In another exemplary embodiment illustrated in FIG. 15, power source 1104 may be comprised of a hybrid battery pack 1104 comprising an ultracapacitor 1420 and a thermodynamically closed electrochemical cell battery 1414, such as a NiMh, NiCd, Li Ion, or Li Polymer cell battery, and a fuel cell 1410, which both fuel cell 1410 and battery 1414 charge an ultracapacitor 1420. The priority sequence for charging is that battery 1414 charges the ultracapacity 1420 first. Upon battery 1414 is low, the fuel cell 1410 kicks in to charge either battery 1414 in turn charging ultracapacity 1420 or to charge ultracapacity 1420 directly. In most of retail wireless handheld scanner applications and transportation PDT applications, only a short cycle operation time when the unit leaves the cradle. The ultracapacity may be sufficient for sustaining the entire short cycle operation without consuming energy from rechargeable battery thus prolong the life of battery.

In an exemplary embodiment for operating a mobile device, an operator may use the mobile device for a short period of time, such as leaving a truck and making a delivery. After making the delivery, the operator would return to the truck and place/secure the mobile device into a docking or charging station until making a next delivery stop. While driving, the mobile device would use power from the charging station to both "top off" the charge on the ultracapacitor as well as provide power for any onboard systems that need to continue in an "active" state (such as WiFi, GPS, etc). By the time the driver arrives at the next stop, the ultracapacitor would be fully charged for the next self-powered interval. At the next stop, the driver would remove the mobile device from the charging station, at which point the mobile device would use the ultracapacitor for power for the next delivery usage. The charging station may consist of either a traditional battery, or some other power source (such as an accessory power plug, etc.).

In an exemplary embodiment, the ultracapacitor may be internal to the body or housing of the mobile device. The ultracapacitor would charge through a connector provided on the mobile device.

In another exemplary embodiment power source may be comprised of a hybrid battery pack 1104 comprising an ultracapacitor and a thermodynamically closed electrochemical cell battery, such as a NiMh, NiCd, Li Ion, or Li Polymer cell battery, wherein the ultracapacitor may be removed from the mobile device and placed into a charging station separate from the mobile device, at which time power for any onboard systems of the mobile device that need to continue in an "active" state (such as WiFi, GPS, etc) may be provided by the thermodynamically closed electrochemical cell battery.

Although some embodiments of the present invention have been shown and described, it will be appreciated by those skilled in the art that changes may be made in these embodiments without departing from the principles and spirit of the invention, the scope of which is defined in the claims and their equivalents.

The invention claimed is:

1. A mobile device comprising:
a data collection device;
a trigger to activate the data collection device;
a communication system for wireless communications;
a display for displaying information;
a processor for controlling software and firmware operation;
a keypad for entering data for the processor;
a hybrid power supply for providing power to the mobile device, the power supply comprising a fuel cell and a thermodynamically closed electrochemical cell battery; and,
a housing for supporting the data collection device, trigger, communication system, display, processor, keypad and hybrid power supply.

2. A mobile device according to claim 1, wherein the thermodynamically closed electrochemical cell battery comprises a at least one of the following: NiMh; NiCd; Li Ion; and a Li Polymer cell battery.

3. A mobile device according to claim 1, wherein the fuel cell and the battery are connected to generate a single output voltage.

4. A mobile device according to claim 1, wherein the thermodynamically closed electrochemical cell battery powers the mobile device during times of high current load requirements and the fuel cell powers the mobile device during lower current load requirements.

5. A mobile device according to claim 1, wherein the fuel cell powers the mobile device during times of high current load requirements and the thermodynamically closed electrochemical cell battery powers the mobile device during lower current load requirements.

6. A mobile device according to claim 1, wherein the fuel cell charges the thermodynamically closed electrochemical cell battery.

7. A mobile device according to claim 1, wherein the fuel cell provides power to a first mobile device subsystem and the thermodynamically closed electrochemical cell battery provides power to a second mobile device subsystem, wherein the second mobile device subsystem has lower power requirements than the first mobile device subsystem.

8. A mobile device according to claim 1, wherein the fuel cell provides power to a first mobile device subsystem and the thermodynamically closed electrochemical cell battery provides power to a second mobile device subsystem, wherein the second mobile device subsystem is a steady state subsystem.

9. A mobile device according to claim 1, wherein the fuel cell is configured to be removed from the mobile device for charging and the thermodynamically closed electrochemical cell battery is configured to provide power to the mobile device when the fuel cell is removed.

10. A mobile device comprising:
a data collection device;
a trigger to activate the data collection device;
a communication system for wireless communications;
a display for displaying information;
a processor for controlling software and firmware operation;
a keypad for entering data for the processor;
a hybrid power supply for providing power to the mobile device, the power supply comprising an ultracapacitor and a thermodynamically closed electrochemical cell battery; and,
a housing for supporting the data collection device, trigger, communication system, display, processor, keypad and hybrid power supply.

11. A mobile device according to claim 10, wherein the thermodynamically closed electrochemical cell battery comprises a at least one of the following: NiMh; NiCd; Li Ion; and a Li Polymer cell battery.

12. A mobile device according to claim 10, wherein the ultracapacitor and the battery are connected to generate a single output voltage.

13. A mobile device according to claim 10, wherein the thermodynamically closed electrochemical cell battery powers the mobile device during times of high current load requirements and the ultracapacitor powers the mobile device during lower current load requirements.

14. A mobile device according to claim 10, wherein the ultracapacitor powers the mobile device during times of high current load requirements and the thermodynamically closed electrochemical cell battery powers the mobile device during lower current load requirements.

15. A mobile device according to claim 10, wherein the ultracapacitor charges the thermodynamically closed electrochemical cell battery.

16. A mobile device according to claim 10, wherein the ultracapacitor provides power to a first mobile device subsystem and the thermodynamically closed electrochemical cell battery provides power to a second mobile device subsystem, wherein the second mobile device subsystem has lower power requirements than the first mobile device subsystem.

17. A mobile device according to claim 10, wherein the ultracapacitor provides power to a first mobile device subsystem and the thermodynamically closed electrochemical cell battery provides power to a second mobile device subsystem, wherein the second mobile device subsystem is a steady state subsystem.

18. A mobile device according to claim 10, wherein the ultracapacitor is configured to be removed from the mobile device for charging and the thermodynamically closed electrochemical cell battery is configured to provide power to the mobile device when the ultracapacitor is removed.

19. A mobile device comprising:
a data collection device;
a trigger to activate the data collection device;
a communication system for wireless communications;
a display for displaying information;
a processor for controlling software and firmware operation;
a keypad for entering data for the processor;
a hybrid power supply for providing power to the mobile device, the hybrid power supply comprising a fuel cell; and,
a housing for supporting the data collection device, trigger, communication system, display, processor, keypad and hybrid power supply.

20. The mobile device of claim 19, wherein the hybrid power supply further comprises an ultracapacitor.

21. A mobile device comprising:
a data collection device;
a trigger to activate the data collection device;
a communication system for wireless communications;
a display for displaying information;
a processor for controlling software and firmware operation;
a keypad for entering data for the processor;
a hybrid power supply for providing power to the mobile device, the hybrid power supply comprising an ultracapacitor; and,
a housing for supporting the data collection device, trigger, communication system, display, processor, keypad and hybrid power supply.

* * * * *